(12) United States Patent
Ullrich

(10) Patent No.: US 11,549,802 B2
(45) Date of Patent: Jan. 10, 2023

(54) SENSOR DEVICE FOR EXAMINING THE COATING OF A DISC

(71) Applicant: STURM MASCHINEN- & ANLAGENBAU GMBH, Salching (DE)

(72) Inventor: Wolfgang Ullrich, Percha (DE)

(73) Assignee: STURM MASCHINEN- & ANLAGENBAU GMBH, Salching (DE)

(*) Notice: Subject to any disclaimer, the term of this patent is extended or adjusted under 35 U.S.C. 154(b) by 0 days.

(21) Appl. No.: 17/002,764

(22) Filed: Aug. 25, 2020

(65) Prior Publication Data

US 2021/0063140 A1 Mar. 4, 2021

(30) Foreign Application Priority Data

Aug. 26, 2019 (EP) ..................................... 19193596

(51) Int. Cl.
*G01B 11/06* (2006.01)
*G01B 11/14* (2006.01)
(Continued)

(52) U.S. Cl.
CPC .......... *G01B 11/0616* (2013.01); *G01B 11/14* (2013.01); *G01B 11/26* (2013.01);
(Continued)

(58) Field of Classification Search
CPC ..... G01B 11/0616; G01B 11/14; G01B 11/26; G01B 2210/44; G01B 11/0683;
(Continued)

(56) References Cited

U.S. PATENT DOCUMENTS

| 5,838,448 A | * | 11/1998 | Aiyer | ................ | G01B 11/0683 |
| | | | | | 356/632 |
| 6,768,552 B2 | * | 7/2004 | Takahashi | .......... | G01B 11/0675 |
| | | | | | 257/E21.53 |

(Continued)

FOREIGN PATENT DOCUMENTS

| DE | 10104684 A1 | 8/2002 |
| DE | 102005009262 A1 | 8/2006 |

(Continued)

OTHER PUBLICATIONS

An Office Action mailed by the Japanese Patent Office dated Nov. 9, 2021, which corresponds to Japanese Patent Application No. 2020-138880 and is related to U.S. Appl. No. 17/002,764; with English language translation.

*Primary Examiner* — Michael P LaPage
(74) *Attorney, Agent, or Firm* — Studebaker & Brackett PC

(57) ABSTRACT

The invention relates to a sensor device for examining the coating of a disc as part of a coating process. The sensor device comprises a first optical sensor system for determining the layer thickness of the coating applied to the disc, and comprises a rotation apparatus. The invention is characterized in that the first optical sensor system is designed to simultaneously identify at least one first position-based measured value and one second position-based measured value, the first and the second position-based measured value describing the distance between the sensor systems and the surface of the disc. As a result of this, the sensor system is configured such that the first position-based measured value of a coated region of the disc and the second position-based measured value of an uncoated region of the disc are identified. Furthermore, the first optical sensor system comprises at least one linear guide, which extends from the central region to the edge. In addition, a control and (Continued)

analysis apparatus is provided for calculating the layer thickness of the disc at the position of the first position-based measured value with the aid of the first and the second position-based measured value. Furthermore, the invention relates to a coating for a disc, comprising inspecting the coating for determining the layer thickness of the coating applied to the disc.

14 Claims, 2 Drawing Sheets

(51) Int. Cl.
    *G01B 11/26*       (2006.01)
    *G01D 5/26*        (2006.01)
    *F16D 65/12*       (2006.01)

(52) U.S. Cl.
    CPC .............. *G01D 5/26* (2013.01); *F16D 65/127* (2013.01); *F16D 2250/0046* (2013.01)

(58) Field of Classification Search
    CPC .... G01B 9/02042; G01B 11/022; G01D 5/26; F16D 65/127; F16D 2250/0046; B05B 12/084; B05B 12/124; B05B 13/0221
    See application file for complete search history.

(56) References Cited

U.S. PATENT DOCUMENTS

| | | | | |
|---|---|---|---|---|
| 7,177,740 | B1* | 2/2007 | Guangjun | G01C 1/06 356/139.09 |
| 7,777,897 | B1* | 8/2010 | Gibbons | G01B 11/303 356/601 |
| 9,677,871 | B2* | 6/2017 | Schonleber | G01B 11/24 |
| 2006/0246213 | A1* | 11/2006 | Moreau | G01B 11/0616 427/8 |
| 2009/0061075 | A1 | 3/2009 | Ruglio et al. | |
| 2009/0262353 | A1* | 10/2009 | Benvegnu | B24B 49/12 356/433 |
| 2013/0098139 | A1* | 4/2013 | Adams, Jr. | G01N 3/56 73/7 |
| 2015/0228069 | A1* | 8/2015 | Fresquet | G01N 21/9501 348/87 |
| 2016/0313117 | A1* | 10/2016 | Pearcey | G01B 11/026 |
| 2018/0172430 | A1 | 6/2018 | Kondameedi et al. | |

FOREIGN PATENT DOCUMENTS

| | | |
|---|---|---|
| JP | H02-044206 A | 2/1990 |
| JP | 2012-225848 A | 11/2012 |
| JP | 2012-530926 A | 12/2012 |
| WO | 2010/150003 A1 | 12/2010 |

* cited by examiner

SENSOR DEVICE FOR EXAMINING THE COATING OF A DISC

The invention relates to a sensor device for examining the coating of a disc as part of a coating process, comprising a first optical sensor system for determining the layer thickness of the coating applied to the disc and comprising a rotation apparatus for rotating the disc, and relates to a coating method for a disc, in particular a brake disc, comprising inspecting the coating to determine the layer thickness of the coating applied to the disc.

Particulate pollution plays a significant role in the current debate around minimizing exhaust emissions in city centers, these emissions partly originating from vehicles. The constituents PM 10 and PM 2.5, which are considered substances that are harmful to human health, are particularly relevant here.

In addition to many causes such as combustion processes in power stations or heaters, road traffic also contributes to particulate pollution in metropolitan areas. The main causes here are internal combustion engines, wear of tires and also wear generated by the braking system.

One option for reducing the emissions that arise during the braking process is to provide a carbide coating on brake discs. In comparison with a conventional brake disc, an up to 90% reduction in the wear and thus the particulate matter can be achieved here.

At this point in time, there are two common methods that are used for this purpose. The first method is called HVOF (high velocity oxygen fuel) flame spraying, and the second method is called laser cladding. In both application methods, it is essential that layers that are as even and defect-free as possible are applied.

In the following, laser cladding is considered in greater detail. In this process, a carrier region of a disc is heated by means of a laser, and a molten bath is produced by supplying a powder or wire that is likewise melted by the laser. An additional layer is thus built up, which is melted together with the carrier material. Normally, the layer is built up in multiple cycles, i.e. in a multi-layered manner. Overall, a disc of this kind is mostly provided with multiple layers in this manner in a spiral shape from the inside out.

It is essential to the quality of the coating to obtain a layer thickness that is as even as possible without any imperfections. In this respect, it is necessary to inspect the coating process and to potentially remedy any imperfections in a second step. This results in optimization of the manufacturing process, and therefore layer thicknesses that are as even and optimal as possible are obtained. Altogether, this saves material and time, since uneven layer thicknesses otherwise have to be removed or evened out in a subsequent grinding process, which is time-consuming.

In laser-coating methods for brake discs, a system is usually provided in which the brake disc to be coated is received in a receptacle by its hub bores and is rotated. The laser-coating device is arranged so as to be stationary relative to the brake disc, but can be moved in the radial direction of the brake disc. During the coating process, the brake disc is rotated at a corresponding speed such that, for example, a spiral-like coating of the disc can be carried out by means of the coating device, which moves radially from the inside out.

The invention is based on the object to provide a sensor device and a coating method which are suitable for efficiently monitoring a coating process of a disc.

This object is solved according to the invention by a sensor device having the features of claim 1 and by a coating method having the features of claim 15.

Advantageous embodiments of the invention are found in the dependent claims, the description and the drawings and the explanation thereof.

In the sensor system according to the invention, it is provided that the first optical sensor system is designed to simultaneously identify at least one first position-based measured value and one second position-based measured value. In said system, the first and the second position-based measured value describe the distance between the first sensor system and the surface of the disc.

Furthermore, the first sensor system is configured to identify the first position-based measured value of a coated region of the disc and the second position-based measured value of an uncoated region of the disc. The first optical sensor system further comprises at least one linear guide, which extends from a central region of the disc to an edge region. Furthermore, a control and analysis apparatus is provided for calculating a layer thickness of the disc at the position of the first position-based measured value with the aid of the first and the second position-based measured value.

A basic concept of the invention is that it was recognized that an absolute measurement of the layer thickness on the relatively thick and optically non-transparent layers is extremely difficult. In addition, different material properties play a role in the measurement, which may each be different depending on the selected coating. These include, inter alia, the magnetization properties, the electrical conductivity or the penetration behavior of the materials used to certain wavelengths, such as the refractive properties of layer boundaries based on the wavelength or spectra.

As a rule, corresponding methods which take this property into account, but which have the significant drawback that they have a relatively low measuring frequency and a large measuring-point diameter could be used for identifying the layer thickness. This means that the method proceeds relatively slowly and also does not provide high-precision spatial resolution.

Therefore, according to the invention it is proposed to carry out a differential measurement to determine the layer thickness. This means that, to determine the layer thickness, a first position-based measured value and a second position-based measured value are identified. The difference between the two position-based measured values is then identified and conclusions are thus drawn on the layer thickness. By means of a high-precision spatial resolution, a surface profile can also be compiled in this way, such that even topographical defects can be detected.

As described, the first optical sensor system used here comprises a linear guide, in order to guide the sensor system from an inner region or central region of the disc to an edge region. Any point on the disc to be coated can thus be reached, considering that the disc is additionally rotated.

Another advantage of using the difference between two position-based measured values is that wobbling behavior of the disc, which may occur in some circumstances due to sub-optimal clamping, can be reduced or subtracted out when identifying the layer thickness. Wobbling behavior of the two position-based measured values is numerically subtracted out by means of the difference between the two measured values.

It is advantageous for the first optical sensor system to comprise a first optical sensor for identifying the first position-based measured value and a second optical sensor for identifying the second position-based measured value.

The use of an optical sensor provides the advantage that a relatively high measuring frequency can be obtained, such that the coating thickness can be identified rapidly and promptly. This is particularly worthwhile for reducing the overall production time, including the examination of the coating. An inline process can thus also be performed in which the layer thickness is identified at the same time as the disc is being coated. In a very slow, low-frequency measuring method, this could only take place offline, i.e. after the coating has been carried out.

In principle, the two optical sensors may be arranged at any point relative to the disc. For example, it is thus possible for the first and the second optical sensor to be arranged in opposite positions on opposite sides of the disc. As a result, by means of the first sensor on the coated side, the distance from a fixed point, for example the first optical sensor system, is identified. In a similar manner, the distance is likewise identified by the second optical sensor on the opposite side of the disc. By means of a comparison with preceding measurements, the additional layer thickness can thus be calculated by the difference between the distances being taken into account. With this positioning, too, the advantage again results that wobbling of the disc is compensated for by the positioning of the two sensors.

Another option is to arrange the first and the second optical sensor on the same side, in particular on the first side of the disc, in positions so as to be radially offset from one another. In this case, the distance between the disc and the first optical sensor system is identified relative to the same side of the disc. If the first optical sensor is directed towards a coated region and the second optical sensor is directed towards an uncoated region, the layer thickness can be identified by the difference in the distance of the sensors from the fixed point or a fixed plane. In this case, too, wobbling would be compensated for, since the wobbling behavior would simultaneously have an effect on both measured values, both of the first and the second optical sensor.

In another embodiment, a third and a fourth optical sensor can be provided, which are arranged in positions so as to be radially offset from one another on a second side of the disc. In other words, these two sensors are opposite the first and second radially spaced sensors. In this case, a simultaneous measurement can be carried out, for example, if both sides of the disc are coated simultaneously. Furthermore, this arrangement offers additional measurement accuracy, since, in addition to the comparison of the measured values for the same side, the measured values for the opposite side can also be consulted. The measurement accuracy is further improved in this way.

For example, a confocal chromatic sensor may be used for the first, second, third and/or fourth optical sensor. Said sensor has a high temporal resolution, such that an inline measurement or examination of the coating is also possible.

Another advantage of this type of sensor is that it has a relatively high spatial resolution, such that the layer thickness can be very precisely calculated or identified at a position.

In another embodiment, the first optical sensor system for simultaneously identifying the at least one first position-based measured value and the second position-based measured value may comprise a first triangulation sensor arranged on a first side of the disc for the measurement in the radial direction of the disc. For example, a triangulation sensor used in this way may have a measuring width of a few millimeters. It is arranged or guided such that part of the sensor scans the coating region while another part scans an uncoated region. Two position-based measured values are thus likewise identified, which can be set against one another similarly to the use of two optical sensors in order to determine the increase in the layer thickness.

In a development of this embodiment, the first optical sensor system may comprise a second triangulation sensor arranged in a position opposite the first triangulation sensor on a second side of the disc. In this case, four measured values can be identified simultaneously, which can be set against one another similarly to the use of four separate optical sensors in order to determine the increase in the layer thickness as well as a vertical profile.

It is also advantageous for each sensor to comprise a linear guide and/or an adjustment apparatus. The linear guide is preferably arranged radially, such that, by means of said guide, the sensor can be moved from an inner region of the disc towards an outer region. By means of an additional rotation of the disc itself, any point of the disc can thus be scanned. The adjustment apparatus, which can additionally be provided, is used to adjust the sensor into an optimal distance from the side of the disc to be measured.

If a plurality of sensors are arranged on the same side of the disc, these sensors may comprise a common linear guide and/or adjustment apparatus.

A configuration of this kind is particularly suitable if one sensor scans a coated region and another sensor scans an uncoated region of the disc, on the same side. In this way, to improve the measuring process, both sensors can be provided on the same linear guide and the same adjustment apparatus.

In the context of the invention, a coated region of a disc can in particular be understood to be a region which has already been provided with at least one coating. By contrast, the uncoated region can be understood to be a region which is either not yet coated or has a lower coating thickness or lower number of coatings than the coated region which is intended to be scanned.

It is advantageous for a second optical sensor system comprising a line scan camera to be provided on one or both sides of the disc which comprises a measuring region that extends substantially over the entire radius of one side of the disc. It is already possible to scan the entire surface of a disc using the first optical sensor system; however, this takes a relatively long time due to the high spatial resolution, inter alia. In this respect, according to the invention it is preferred for the scanning to be carried out only at points or in a strip-like manner by the first sensor system and for only the layer thickness to be determined. In order to allow further defect detection, potentially also for pre-selecting regions to be scanned by the first optical sensor system, the second optical sensor system can be provided with a line scan camera. This may, for example, comprise bright/dark-field illumination, which is alternately switched in a rotational manner. As a result, it is possible to very rapidly capture an image of the surface, which can be used to detect defects.

On the basis of any defects that are potentially detected, the layer thickness can then be determined more accurately by means of the first sensor device and a defect can be verified or ruled out.

Preferably, an apparatus is further provided for identifying the position of the center of the disc relative to the first and/or second optical sensor system. An apparatus of this kind is used to define a reference point for the first and/or the second optical sensor system. If the center point of the disc can be identified, the relative position of the first and/or second optical sensor system can thus be determined by means of the apparatus for identifying the position of the center, such that reliable data can be produced.

In order to achieve even greater accuracy, an apparatus can further be provided for identifying the angular position of the disc. Together with the exact angular position and a zero point, the position of the measured values can thus be accurately determined in conjunction with the first and/or second optical sensor system.

It is preferable for the control and analysis apparatus to be designed to continuously and/or discontinuously identify the position-based measured values. There are various options for ultimately identifying the position-based measured values. One option is what is known as the inline method, in which the position-based measured values and thus the layer thickness are determined in parallel with the coating of the disc. Another option is to first coat one side of the disc or a region thereof, and to then identify the layer thickness applied.

In principle, it is possible here to use the first sensor device to scan any possible points on a disc or the surfaces thereof; however, this takes a relatively long time depending on the sensor system used. Therefore, for example, the disc can be scanned in a spiral-like manner, with gaps between the scanning lines. Other curve shapes are also possible for the scanning, however. In addition, whether continuous scanning is carried out by means of the position-based measured values or particular regions determined in a punctiform manner are scanned can be determined depending on the exact field of application.

The sensor device according to the invention can be used particularly well for a coating apparatus for a brake disc. As already explained above, it is advantageous here for a high-strength coating to be applied, such that the quantity of particulate matter that arises due to wear is reduced. The sensor device according to the invention can be used to ensure that the coating is even and thick enough.

In the claimed coating method for a disc, in particular a brake disc, comprising inspecting the coating to determine the layer thickness of the coating applied to the disc, at least one position-based measured value and one second position-based measured value are identified simultaneously using a first optical sensor system. The first and the second position-based measured value describe the distance between the first optical sensor system and the surface of the disc, wherein the first position-based measured value of a coated region of the disc and the second position-based measured value of an uncoated region of the disc are identified. The layer thickness of the disc at the position of the first position-based measured value is calculated with the aid of the first and the second position-based measured value. In order for it to be possible to examine any point on the disc, the disc can be rotated by means of a rotation apparatus while the coating is being inspected and the first optical sensor system can be moved by means of at least one linear guide, which extends from a central region of the disc to an edge region.

The invention is explained in greater detail in the following on the basis of schematic embodiments with reference to the drawings, in which.

Figure 1:
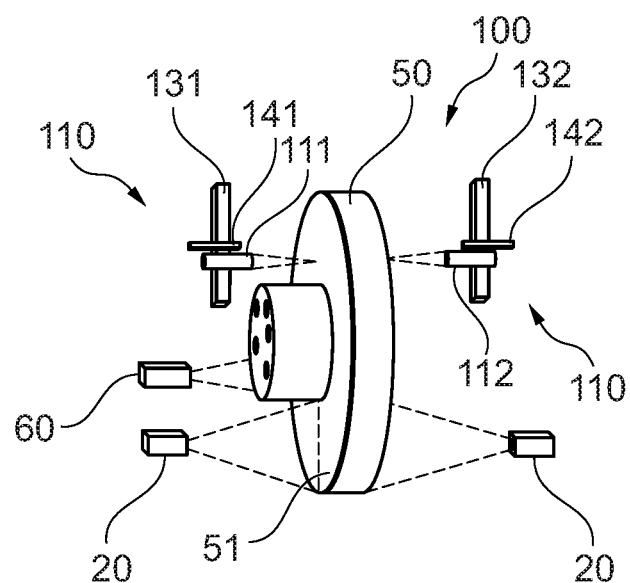
FIG. 1 is a schematic view of a first embodiment of a sensor device according to the invention.

FIG. 1 shows a first embodiment of a sensor device 100 according to the invention. The sensor device according to the invention comprises a first optical sensor system 110 constructed in two parts. Each part of this sensor system 110 is arranged on an opposite side of a disc 50, which may in particular be a brake disc. As already described, the aim of the sensor device 100 according to the invention is to determine the layer thickness of a coating of the disc 50.

Each sub-unit of the first optical sensor system 110 comprises an optical sensor 111, 112. Each of these sensors 111, 112 is fastened to a linear guide 131, 132 and additionally comprises an adjuster 141, 142.

A confocal chromatic sensor which determines the distance from the corresponding side of the disc 50 can be used as an optical sensor 111, 112 here.

Furthermore, a second optical sensor system 20 is provided, which may be designed in the form of a line scan camera, for example. This line scan camera is selected such that the region from the center point to the outer radial end of the disc 50 can be monitored.

Furthermore, an additional line scan camera 60 is also provided in the central region, i.e. the middle region, of the disc 50. This serves to determine the precise center point of the disc 50, such that the measured values identified by means of the first optical sensor system 110 and the second optical sensor system 20 can be specified relative to a fixed point. This fixed point is the fastening point of the disc 50, for example.

What is not shown here is the rotation apparatus, which makes it possible to rotate the disc 50 such that, during the measuring processes, the two sensor systems 110 and 20 can remain stationary or are only moved in the radial direction.

In the following, further details will be given on the functionality of the two sensor systems 110, 20.

As already described, the first optical sensor system 110 has two optical sensors 111 and 112, which are arranged on opposite sides of the disc 50 in substantially opposite positions. By means of the two adjusters 141, 142, the two optical sensors 111, 112 are brought to an optimal distance from the surface of the disc 50, such that an accurate, reliable and efficient measurement can be carried out. The relevant distance from the disc 50 is then determined by means of the two sensors 111, 112.

In the embodiment according to FIG. 1, this measurement is repeated if a coating 51 has been applied to one side of the disc 50. It is possible to determine the thickness of the coating from the identified distance of the two optical sensors 111, 112 at the different points in time, once with a coating and once without a coating.

By means of the first optical sensor system 110, it is possible to determine a layer thickness for the coating of the disc 50. Owing to the sensors used, however, it is not economical to section off every point on the disc 50 in order to produce a highly accurate resolution of the layer-thickness distribution overall. The disc 50 is preferably scanned in a spiral shape or meandering shape. Strip-shaped or circular scanning is also possible, however, in which the multiple circles are scanned with differing distances from the center in each case.

In order to carry out a measurement, the disc 50 is rotated by means of the rotation apparatus and the two sensors 111, 112 are shifted by means of the linear guides 131, 132.

The second optical sensor system 20 is provided to make it possible to further improve the measurement accuracy and to determine potential coating defects over the entire surface of the disc 50. As already described, this consists of a line scan camera, which is arranged such that it can capture images or identify measured values from the center to the outer edge of the disc 50. During the rotation of the disc, values are continuously identified by the second optical sensor system 20 using bright/dark defect recognition, for example. Said values can then be used for defect identification and quality control, in order to determine whether the coating has been unsuccessful or is defective at certain points.

Figure 2:
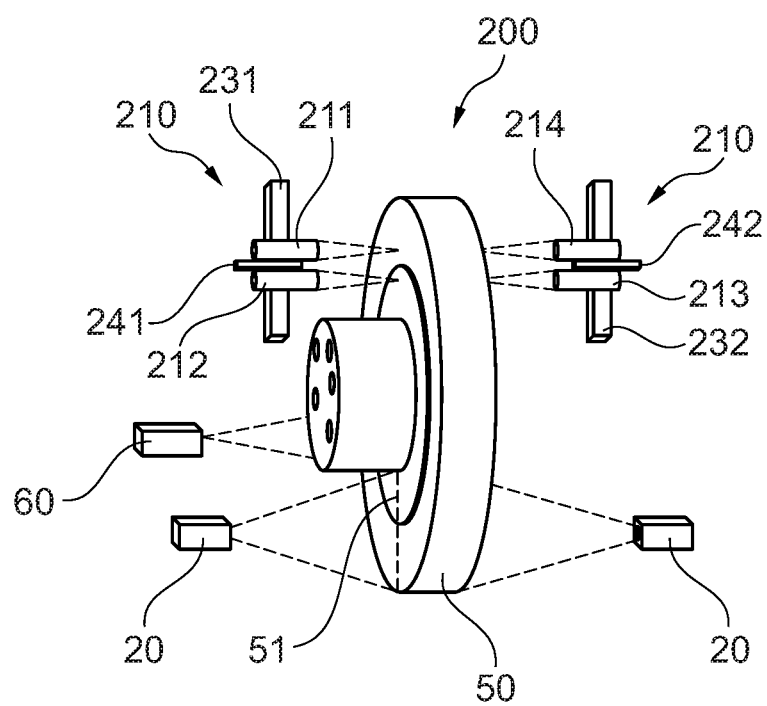
FIG. 2 is a schematic view of a second embodiment of a sensor device according to the invention.

FIG. 2 shows another embodiment of a sensor device 200 according to the invention.

In this figure, identical components from FIG. 1 are denoted by the same reference signs and are not described again.

The sensor device 200 according to the invention differs from the device 100 from FIG. 1 on account of a slightly differently constructed first optical sensor system 210.

In the embodiment shown here, this consists of a total of four optical sensors 211, 212, 213, 214. Here, two optical sensors 211, 212 and 213, 214 are each provided on the same side of the disc 50. The two sensors 211, 212 and 213, 214 arranged on the same side of the disc 50 share a common linear guide 231, 232 and a common adjuster 241, 242.

Inline measurement is possible with the embodiment shown. This means that, even during the process of coating the disc 50, the layer thickness applied can be identified. For this purpose, the two optical sensors 211, 212 and 213, 214 which are positioned on the same side of the disc 50 are arranged such that an optical sensor 211, 213 scans a coated region and the optical sensor 212, 214, which is adjacent thereto, scans an uncoated region. As a result, the layer thickness can be identified from the difference between the two measurements.

Figure 3:
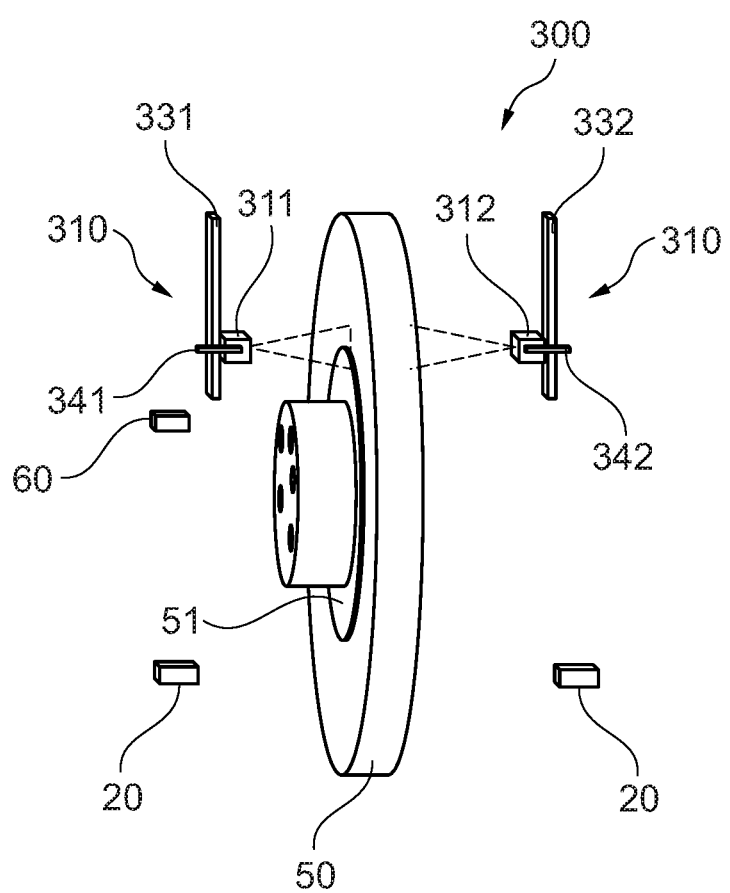
FIG. 3 is a schematic view of a third embodiment of a sensor device according to the invention.

With reference to FIG. 3, a third embodiment of the sensor device 300 according to the invention is lastly described. Here too, the sensor device 300 merely differs from the above-described configurations on account of the precise configuration of the first optical sensor system 300.

In this case, the first optical sensor system 300 comprises two optical sensors 311, 312 arranged on opposite sides of the disc 50. The optical sensors 311, 312 are triangulation sensors. These are each, in turn, arranged on a linear guide 331, 332 comprising a corresponding adjuster 341, 342. The triangulation sensors 311, 312 are constructed such that they can monitor a region of the disc 50 in which a coating 51 is provided and in which no coating is provided. This makes it possible to identify the layer thickness by means of the measured values identified by the sensors 311, 312.

Another advantage of the sensor device 100, 200, 300 according to the invention, which arises due to sensors 111, 112, 211, 212, 213, 214, 311, 312 being arranged on both sides of the disc 50 and the measured values identified thereby being used overall to determine the layer thickness, is that wobbling, which occurs due to sub-optimal clamping of the disc 50, can be subtracted out using the identified measured values.

Using the sensor device according to the invention, it is possible to rapidly and efficiently obtain highly accurate values for identifying the layer thickness.

The invention claimed is:

1. Sensor device for examining a coating applied to a surface of a disc as part of a coating process, comprising:
   a first optical sensor system configured to determine the layer thickness of the coating applied to the surface of the disc, and comprising a rotation apparatus configured to rotate the disc,
   characterized in that
   the surface of the disc is planar,
   the first optical sensor system is configured to simultaneously identify a first position-based measured value and a second position-based measured value,
   the first position-based measured value and the second position-based measured value each describe a distance between the first optical sensor system and the surface of the disc,
   the first position-based measured value is identified at a position corresponding to a region of the disc in which the coating is applied to the surface of the disc,
   the second position-based measured value is identified at a position corresponding to a region of the disc in which the coating is not applied to the surface of the disc,
   the first optical sensor system comprises at least one linear guide, which extends from a central region of the disc to an edge region of the disc,
   a control and analysis apparatus is provided and configured to calculate a layer thickness of the disc at the position of the first position-based measured value based on the first position-based measured value and the second position-based measured value,
   a sensor is provided and configured to identify a position of the center of the disc relative to the first optical sensor system,
   a sensor is provided and configured to identify the angular position of the disc, and
   the position of the first position-based measured value and the position of the second position-based measured value are identified based on the angular position of the disc and the position of the center of the disc relative to the first optical sensor system.

2. Sensor device according to claim 1,
characterized in that
the first optical sensor system comprises a first optical sensor for identifying the first position-based measured value and a second optical sensor for identifying the second position-based measured value.

3. Sensor device according to claim 2,
characterized in that
the first and the second optical sensor are arranged in opposite positions on opposite sides of the disc.

4. Sensor device according to claim 2,
characterized in that
the first and the second optical sensor are arranged in a position so as to be radially offset from one another on a first side of the disc.

5. Sensor device according to claim 4,
characterized in that
a third and a fourth optical sensor are provided, which are arranged in positions so as to be radially offset from one another on a second side of the disc.

6. Sensor device according to claim 1,
characterized in that
at least the first and the second optical sensor are designed as confocal chromatic sensors.

7. Sensor device according to claim 1,
characterized in that
the first optical sensor system for simultaneously identifying the at least one first position-based measured value and the second position-based measured value comprises a first triangulation sensor arranged on a first side of the disc for the measurement in the radial direction of the disc.

8. Sensor device according to claim 7,
characterized in that the first optical sensor system comprises a second triangulation sensor arranged in a position opposite the first triangulation sensor on a second side of the disc.

9. Sensor device according to claim 1, characterized in that
a sensor is provided, the sensor comprising a linear guide and/or an adjustment apparatus.

10. Sensor device according to claim 1, characterized in that
sensors arranged on the same side of the disc are provided, the sensors comprising a common linear guide and/or adjustment apparatus.

11. Sensor device according to claim 1, characterized in that
a second optical sensor system comprising a line scan camera is provided on one or both sides of the disc and comprises a measuring region that extends substantially over the entire radius of one side of the disc.

12. Coating device for a brake disc, comprising:
a sensor device according to claim 1,
wherein the coating device is configured to carry out the coating process, and
the sensor device is configured to examine the coating of the disc as part of the coating process.

13. Coating method for a disc,
comprising inspecting a coating applied to a surface of the disc to determine a layer thickness of the coating applied to the surface of the disc,
wherein the surface of the disc is planar,
wherein a first position-based measured value and a second position-based measured value are simultaneously identified by a first optical sensor system,
wherein the first position-based measured value and the second position-based measured value each describe a distance between the first optical sensor system and the surface of the disc,
wherein the first position-based measured value is identified at a position corresponding to a region of the disc in which the coating is applied to the surface of the disc,
wherein the second position-based measured value is identified at a position corresponding to a region of the disc in which the coating is not applied to the surface of the disc,
wherein a layer thickness of the disc at the position of the first position-based measured value is calculated based on the first position-based measured value and the second position-based measured value,
wherein the disc is rotated by means of a rotation apparatus configured to rotate to disc while the coating is being inspected,
wherein the first optical sensor system is moved by means of at least one linear guide, which extends from a central region of the disc to an edge region of the disc,
wherein a position of the center of the disc is identified relative to the first optical sensor system,
wherein the angular position of the disc is identified, and
wherein the position of the first position-based measured value and the position of the second position-based measured value are identified based on the angular position of the disc and the position of the center of the disc relative to the first optical sensor system.

14. Coating method according to claim 13, wherein the disc is a brake disc.

* * * * *